United States Patent [19]

Ruchel et al.

[11] Patent Number: 4,676,848
[45] Date of Patent: Jun. 30, 1987

[54] BRASS ALLOY

[75] Inventors: Peter Ruchel, Lauf; Lothar Hofmann, Neumarkt, both of Fed. Rep. of Germany

[73] Assignee: Diehl GmbH & Co., Nuremberg, Fed. Rep. of Germany

[21] Appl. No.: 750,543

[22] Filed: Jul. 1, 1985

[30] Foreign Application Priority Data

Jul. 27, 1984 [DE] Fed. Rep. of Germany ....... 3427740

[51] Int. Cl.[4] ................................................ C22C 9/04
[52] U.S. Cl. ..................................................... 148/434
[58] Field of Search ................ 148/413, 432, 434, 435

[56] References Cited

U.S. PATENT DOCUMENTS

| | | | |
|---|---|---|---|
| 2,315,700 | 4/1943 | Hehemann | 148/434 |
| 3,544,313 | 12/1970 | Sadoshima et al. | 148/434 |
| 4,242,131 | 12/1980 | Shapiro et al. | 148/434 |

FOREIGN PATENT DOCUMENTS

| | | | |
|---|---|---|---|
| 57-76143 | 5/1982 | Japan | 148/434 |
| 59-118842 | 7/1984 | Japan | 148/434 |

*Primary Examiner*—R. Dean
*Attorney, Agent, or Firm*—Scully, Scott, Murphy & Presser

[57] ABSTRACT

A brass alloy, a process for the production of a brass material or semi-finished brass product from that type of a brass alloy, as well as to the utilization of the brass material; in essence, the brass alloy for semi-finished products and semi-finished articles, which in addition to a good workability must possess a high resistance to wear, especially when employed for synchronous rings. The foregoing is possible through the intermediary of entirely determined contents of chromium and/or zircon in the previously described brass alloy. The chromium contents hereby vary, on the one hand, in dependence upon the silicon contents, and on the other hand, however, also to a lesser measure upon the remaining alloy components within the range of between 0.01 to 0.15% by weight, and preferably between 0.05 and 0.1% by weight.

5 Claims, 7 Drawing Figures

BRASS ALLOY

BACKGROUND OF THE INVENTION

1. Field of the Invention

The present invention relates to a brass alloy, a process for the production of a brass material or semi-finished brass product from that type of a brass alloy, as well as to the utilization of the brass material; in essence, the brass alloy for semi-finished products and semi-finished articles, which in addition to a good workability must possess a high resistance to wear, especially when employed for synchronous rings.

Different types of materials are used for synchronous rings, such as special brasses and aluminum alloys; however, also compound materials, such as special brasses which are coated with hard metals, and the like. Hereby, the last-mentioned materials are limited in their use to special applications because of cost reasons, whereas with regard to special brasses, for instance, aluminum alloys, because of constantly rising requirements, especially in automobile construction, there are encountered increasing problems with respect to the wear characteristics.

Accordingly, it is a basic purpose of the present invention to provide a brass alloy, in effect, a brass material, which will adequately meet the increasing demands set thereon with respect to the wear characteristics.

In order to achieve the foregoing, there is inventively proposed a brass object having the following composition, in percent by weight:

10 to 35% zinc,
4 to 12% manganese,
2 to 7% aluminum,
1.1 to 4% silicon,
0.01 to 0.15% chromium and/or zircon, with the measure that the silicon is essentially present in the form of crystalline manganese silicide, including selectively
up to 2% lead,
up to 2% nickel,
up to 1% usual impurities,
wherein the proportion of iron impurities may not exceed 0.7%,
the remainder being copper.

An alloy of that type possesses the particular advantage in that notwithstanding the technological properties which can be attained, it can be produced from relatively inexpensive components. In particular, alloy constituents which generally can be smelted only in the form of especially expensive key constituents, such as for instance iron, are thus not necessary, or are only present as impurities in minute quantities.

Alloys which are based on Cu-Zn-Al of the above-mentioned composition are associated with special brasses from the standpoint of the alloying technology. Such types of alloys are widely utilized for wear-resistant components, for example, synchronous rings.

2. Discussion of the Prior Art

Thus, from the disclosure of German Laid-Open Patent Application No. 29 19 478, which is assigned to the common assignee of the present application, there is known a brass alloy which is utilized for synchronous rings, and which has the following composition, in percent by weight:

60 to 75% copper,
6 to 8% manganese,
4 to 6% aluminum,
1 to 4% silicon,
1 to 3% iron,
0.5 to 1.5% lead,
selectively
up to 0.2% nickel,
0.2% tin,
up to 0.05% of one or more of the elements constituted of chromium, vanadium, titanium, the remainder being zinc.

The hereby achieved relatively high wear resistance can be traced back to the intermetallic compounds which are formed from iron, manganese and silicon. The additions of chromium, vanadium, and titanium, should hereby assist, besides the iron, in a grain or crystalline fining of the matrix. In this alloy, particularly also because of the relatively high iron content of 1.6% by weight, there are encountered higher costs in the preferred embodiment, inasmuch as on the one hand, this can be brought about only through the use expensive key constituents and, on the other hand, is necessary for the formation of the especially fine-grained matrix.

Furthermore, there can be ascertained from the disclosure of German Pat. No. 21 45 690 a brass alloy which is wear-resistant at a high temperature, which can be utilized as a valve seat material for internal combustion engines. Thusly, such types of parts must possess properties which are similar to synchronous rings, especially the most possibly constant coefficient of friction, which must be, however, as low as possible in valve seats; whereas the coefficient of friction for synchronous rings must be as high as possible. This brass alloy has the following composition, in percent by weight:

25 to 40% zinc,
1 to 8% aluminum,
1 to 5% manganese,
0.8 to 3% chromium,
0.3 to 2% silicon,
0.3 to 1% phosphorus,
selectively up to 2% iron and/or nickel and further selective components, in which the selective components may not exceed a total proportion of 5%; the remainder being copper.

Hereby, aluminum or chromium should strengthen the crystalline matrix and assist in the improvement the the resistance to wear; silicon together with manganese forming a hard intermetallic compound which also assists in an increase in the resistance to wear. Phosphorus serves as a deoxidizer, and should also similarly increase the hardness of the material.

In alloys of that type which are based on Cu-Zn-Al, as a result of the introduction of aluminum into the copper-zinc matrix (through prestressing the original matrix). These alloys obtain their resistance to wear through intermetallic compounds (silicides), and especially the metals of iron and manganese with silicon. The resistance to wear hereby increases within a certain range with the proportional quantity of the silicides. The general attempts are now being directed to increase the proportional quantity of silicides and thereby the resistance to wear.

However, with an increase in the proportional quantity of silicides there is also increased the danger of the formation of extremely coarse silicide exudations, as well as the coagulation of the silicides into aggregates or solid complexes. Both processes increase the danger of brittle failures in parts which are constituted from such kinds of alloys. Brittle failure or fracture is, however, extremely undesirable in such types of parts, for example, synchronous rings, since this can produce extensive consequential damages.

Moreover, such types of silicide-enriched regions enrichments stand automatically opposite regions which are impoverished in silicides, which in every instance result in parts encumbered with an inadequate resistance to wear.

The silicon content of the included wrought alloys, pursuant to the German Industry Standards DIN 17 660, CuZn40Al 1 and 2, is thereby limited to contents of up to a maximum of 1% by weight. Silicon contents of up to a maximum of 2% by weight are more representative of an exception in those types of alloys. Thus, the higher silicon contents in such types of alloys referred in the prior art patents can hardly be realized, as can also be ascertained from the following exemplary illustrations:

From the claimed protection of German Laid-Open Patent Application No. 29 19 478 there can be ascertained a silicon content of up to 4% by weight. In contrast therewith, the preferred embodiment mentions a silicon content of 1.5% by weight. Actually, this alloy can be utilized with a maximum silicon content of about 1.7% by weight for preferably the indicated purpose.

Also, in German Pat. No. 21 45 690 is there claimed up to 2% silicon, whereas the illustrated examples indicate a silicon content of a maximum of 0.8%.

Investigated by a producer of alloys for such types of alloys are maximum silicon contents of 1.53% (Automobiltechnische Zeitschrift 83 (1981) 227-230).

From the above mentioned there can be ascertained that it is in general, relatively difficult to introduce larger silicide quantities in a correctly implementable manner into a Cu-Zn-Al material. In addition thereto, however, it is also not possible to employ suitable methods which would appear to be adaptable to a refinement and uniform distributing of the silicide exudates. Thus, surprisingly, it has been determined that a refinement of the silicides at the same volumetric proportion of silicides will lead to a clear deterioration in the resistance to wear. Thus, it is necessary that there be assured a silicide quantity correlated with the desired increased resistance to wear, wherein the silicides, in addition to a homogeneous distribution, also possess a certain median size within a predetermined size range.

SUMMARY OF THE INVENTION

The foregoing is inventively possible through the intermediary of entirely determined contents of chromium and/or zircon in the previously described brass alloy. The chromium contents hereby vary, on the one hand, in dependence upon the silicon contents, and on the other hand, however, also to a lesser measure upon the remaining alloy components within the range of between 0.01 and 0.15% by weight, and preferably between 0.05 and 0.1% by weight.

Lower contents of chromium and/zircon remain without effect on the silicide exudation, higher contents lead to unfavorably fine silicide exudates, which significantly reduce the resistance to wear. Thereby, chromium and zircon can always be replaced, and can also be employed additively. The quantity of chromium or zircon which is to be added must always be determined in dependence upon all constituents of the alloy. Thus, for example, it has been ascertained that, in a surprising manner, at higher aluminum contents there must also be increased the addition of chromium or zircon, in order to be able to achieve the same form for the silicide exudates. At an excessively high addition of chromium or zircon, besides the presence of silicide exudates which are too fine, there are also encountered coarse agglomerations of these exudates, whereby a brass alloy of that type would also become extensively unusable.

In the inventive brass alloy there is thus obtained a surprisingly selective method for the control over the shape and distribution of the silicide exudates, with respect to resistance to wear and resistance to fracture of an applicable material.

BRIEF DESCRIPTION OF THE DRAWINGS

Further advantages and advantageous embodiments of the present invention can now be ascertained from the following detailed description, wherein in the accompanying drawing there is more closely illustrated the matrix of the inventive material; and in which.

DETAILED DESCRIPTION

Figure 1:
FIGS. 1 and 2 illustrate micrographs of a Cu-Zn-Al material without and with a chromium content.
Figure 2:

For the hereinbelow employed terminology relative to alloy, material and semi-finished product or semi-finished articles, there are applicable the following concepts:

Alloy-relates generally to the chemical composition;

Material- "finished alloy", includes chemical composition and matrix:

Semi-finished product or Semi-finished article relates to a material which already possesses a defined external shape and requires further processing into a final product.

The inventive alloy is constituted of the following constituents (all amounts for the composition hereinbelow given in percent by weight):
10 to 35% zinc,
4 to 12% manganese,
2 to 7% aluminum,
1.1 to 4% silicon,
0.01 to 0.15% chromium and/or zircon, selectively
up to 2% lead,
up to 2% nickel,
up to 1% usual impurities,
the remainder being copper.

Thereby the content of manganese is coupled with that of the applicable silicon content, in which it is prescribed that the silicon is essentially present in the form of manganese silicide.

With regard to the impurities, it is further prescribed that the total proportion of iron impurities may not exceed 0.7%.

In a material possessing this alloy composition, copper zinc and aluminum form the basic matrix. The applicable boundary ranges for these components are essentially prescribed by the usual requirements regarding the hardness and the workability of the material. Hereby, there should regulate itself for this material a $\beta$-matrix, or a $\beta+\alpha$- matrix. $\gamma$-matrix constituents should, if at all possible, be avoided.

The lower limits and upper limits for manganese and silicon constituents are coupled to each other; in effect, 1.1% silicon, or respectively, 4% silicon, necessitate in the inventive alloy composition, about 4% manganese or, respectively, 12% manganese, in order to be able to completely present as silicides. The lower limits are furthermore obtained from the minimum quantities of 5% of silicides which are necessary for the wear resistance properties. The upper limits of 12% manganese, or respectively, 4% silicon are obtained by the maximum quantity of 16% silicide which is sensibly introduceable into the basic matrix. Above thereof are there obtained nonuniform silicide exudates, which adversely influence the wear resistance properties. Preferably, there are utilized silicon contents of between 2 and 3% in combination with manganese contents above 6%, inasmuch as within this range there are obtained, for the preferred utilization of the alloy as synchronous rings, the most balanced material properties.

Chromium or zircon are added within the range of 0.01% and 0.15%, and influence the silicide exudation. Hereby, below a content of about 0.01% chromium or zircon there are no longer extend any important influences over the silicide exudation, whereas for proportions above about 0.15%, the silicide exudations become too fine, and additionally can form excessively coarse agglomerations. Chromium or zircon can be employed either selectively or also additively. The quantity of chromium and or zircon presently added is dependent upon the silicon quantity and the desired shape of the silicide exudates, as well as also to a lesser extent upon the proportions of the remaining constituents, esecially the aluminum content, and namely such, that at an increasing silicon quantity, refinement of the silicide exudates and increasing aluminum proportion, there is necessary an increased chromium content. Preferably, the chromium contents range between 0.05 and 0.1% since, as a result, for the preferred utilization as synchronous rings, there are obtained the most balanced material properties.

The mechinism for the influencing of the silicide exudates by means of chromium or zircon functions pursuant to the current recognitions in the following manner: As is known, manganese silicides form themselves from the smelt due to their being unaffected by higher temperatures, during the cooling already prior to the solidification of the basic matrix of Cu-Zn-Al. Chromium or zircon, or their compounds, act as nuclei formers for the silicide formation. In accordance with the number of the nuclei formers which are present, in effect, dependent upon the chromium or zircon content, there are then formed a corresponding number of silicide exudates, which though the limited content of manganese and silicon in the alloy can attain only a certain median grain size.

Especially through the addition of chromium or zircon is therein a surprising manner, also suppressed any eutectic refined eudation or separation of the silicides, which in the state of the technology constitutes a large part of the totally present quantity of silicide; however, without affording any correspondingly large part the wear characteristics.

Further possible additive materials to the inventives alloy consist of lead and nickel:

The selective component of lead can be added up to a content of about 2%, and in particular improves the property of the material for machining work or finishing.

The selective component of nickel can also be added up to a quantity of about 2% and preferably acts as a brake or retardant on any diffusion. Nickel is accordingly only added when lengthier heat treatments are contemplated for the material, in which the matrix should not possibly change in any undesirable manner because of diffusion.

The alloy, with respect to its matrix formation is relatively tolerant in connection with the usual contaminations encountered during the production of the brass. Consequently, proportions of the usual impurities of up to 1% are permissible. This, in all instances, does not pertain to iron impurities. Iron constituents in these impurities are permissible only up to a maximum of 0.7%. Iron constituents above this limit, in particular above 1%, render difficult the smelting and adversely influence the homogeneity of the manganese silicide exudates. This will adversely affect the technological properties of the material.

The manufacturing process for material, such as a semi-finished product with the previously described alloy composition is extremely simple, inasmuch as the silicides which are of significance for the high resistance to wear are ready produced as the primary exudate.

In the inventive manufacturing process, the alloy which is smelted in the usual manner is cast at temperatures above about 1000° C., or preferably extrusion-molded and cooled at a suitable cooling speed down to temperatures of below 400° C. This cooled material, for instance the semi-finished product which is already formed through extrusion, possesses a basic matrix which, in dependence upon the proportions of copper, zinc and aluminum, as well as the cooling speed, consists of a pure $\beta$-matrix crystalline solid solution and with a rising copper equivalence (theoretical copper content) and dropping cooling speed of a $\beta+\alpha$-matrix crystalline solid solution, whereby the $\beta$-constituent is, as a rule, dominant.

Introduced into this $\beta$- or $\beta+\alpha$-matrix, preferably within the granules, are the primary exudates which are constituted essentially of managnese silicide. Thes manganese silicides are homogeneously distributed to the greatest extent, and are of a relatively uniform size due to the hereinabove already described chromium/zircon nuclei forming mechanism. The manganese silicides in this material are present in the usual needlelike configuration, whereby preferably the diameter of the needles is in the magniutde of about 5 $\mu$m, and the length of about up to 30 $\mu$m.

The cast and preferably cooled material can be subjected to further heat deformation steps within the temperature range of between 550° C. and 800° C., and preferably between 620° C. and 720° C. As a first heat transformation step there can hereby be preferably utilized extrusion presses, and thereafter selectively, for example, drop forging dies.

Furthermore, it is also possible that, following the individual forming steps, there are implemented heat treating steps within the temperature range of between 200° and 500° C. These heat treating steps serve for the stress relieving or hardening of the matrix; in effect, for the setting of certain matrix conditions, for example, an increase in the $\alpha$-proportion in the $\beta+\alpha$solid solution crystalline matrix. The heating periods hereby lie within the range of a few seconds (for example, inductive heating prior to the drop forging) and about 24 hours (for example, stress relieving annealing at lower temperatures).

Hereby, the heat deforming steps, as well as the heat treating steps, essentially evidence themselves only as changes in the basic matrix of the Cu-Zn-Al. The manganese silicides which are present as primary exudates, in contrast therewith, remain practically uninfluenced.

Such type of brass materials, or brass alloys, can be readily employed, because of the described silicide exudates, in an advantageous manner for semi-finished products and semi-finished articles, which in addition to a good workability, must possess a high resistance to wear. Preferably, a synchronous rings for motor vehicle drive systems are produced from this material.

EXEMPLARY EMBODIMENTS AND COMPARATIVE EXAMPLES:

TABLE I

| Alloy Constituent | Compositions in percent by weight: Alloy No. | | | | | | | |
|---|---|---|---|---|---|---|---|---|
| | 1 | 2 | 3 | 4 | 5 | 6 | 7 | CuZn40Al 2 |
| Cu | 59,4 | 59,4 | 60,6 | 60,6 | 68,5 | 68,5 | 68,5 | 58,5 |
| Zn | 26,6 | 26,6 | 27,5 | 27,5 | 14,3 | 14,3 | 14,3 | 35,9 |
| Mn | 8,0 | 8,0 | 6,4 | 6,4 | 7,65 | 7,50 | 7,30 | 2,0 |
| Al | 2,5 | 2,5 | 2,5 | 2,5 | 6,0 | 6,0 | 6,0 | 1,6 |
| Si | 2,25 | 2,25 | 1,75 | 1,75 | 2,5 | 2,5 | 2,5 | 0,8 |
| Cr | — | 0,05 | — | 0,05 | 0,10 | 0,20 | 0,40 | — |
| Pb | 0,5 | 0,5 | 0,5 | 0,5 | 0,5 | 0,5 | 0,5 | 0,4 |
| Impurities | only Fe analyzed, remainder primarily constituted on Ni and Sn | | | | | | | |
| Fe | 0,5 | 0,5 | 0,5 | 0,5 | 0,3 | 0,3 | 0,3 | 0,5 |

In the foregoing Table I there are represented the constituents of different alloys, with respect to their matrices and wear properties, a more detailed elucidation is set forth hereinbelow.

The composition of the Alloy of 1 and 2, or respectively 3 and 4, are each identical up to their chromium content, whereby the Alloy 1 and 3 each do not possess any chromium component, whereas the Alloy 2 and 4 each possess a chromium component of 0.05%.

The composition of Alloys 5 through 7 is essentially identical (only the manganese content varies to some extent) up to the chromium content, which for Alloy 5 is equal to 0.10%; for Alloy 6 is equal to 0.20%, and for Alloy 7 is equal to 0.40%.

The alloy CuZn40Al 2 represents a standard synchronous ring alloy, which serves as a reference for the subsequently described wear comparison.

All of the alloys mentioned in Table I are smelted in a crucible furnace, and at an initial temperatures above 1000° C. cast in continuous extrusion at a 220 mm diameter. Subsequent to cooling down at an average cooling rate, there are withdrawn matrix samples, which are prepared in the usual manner. In FIGS. 1 through 7 (the figure numbers are identical with the alloy numbers) there are represented typical matrix photographs of these materials at 200 times magnification.

Figure 3:
FIGS. 3 and 4 illustrate micrographs of a further Cu-Zn-Al material without and with a chromium contents.

The matrices which are illustrated in FIGS. 1 and 3 indicate extremely non-homogeneous manganese silicide exudates (represented by the dark areas in the photograph). In particular there are also recognizable the eutectic silicide exudates addressed in connection with the state of the technology (FIG. 1: lower-half of photo, middle; FIG. 3: lower-left). In the matrices pursuant to FIGS. 2 and 4 there can be readily recognized the positive effect of the chromium additions of 0.05% on the homogeneity of the manganese silicide exudates; in effect, the silicides are essentially more uniformly distributed and evidence extremely similar dimensions (in the sectional photograph, the randomly-oriented needlelike manganese silicide exudates are only to a small extent located exactly within the sectional plane, so that only their cross-sections are visible). The fine lines which are further partially recognizable in FIGS. 1 through 4 within the bright background represent the grain or crystal boundaries of the basic matrix. In particular, no eutectic silicide exudates can be ascertained.

Figure 5:
FIGS. 5 through 7 illustrate micrographs of essentially identically composed Cu-Zn-Al materials with different chromium contents.
Figure 6:
Figure 7:
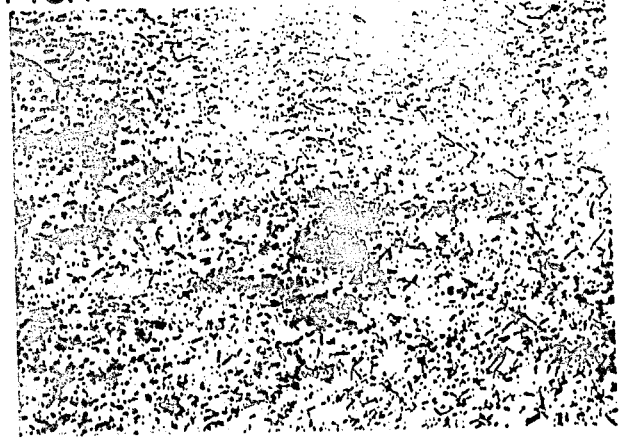

FIGS. 5 through 7 illustrate the effects of excessively high chromium additions on the (darkly represented) manganese silicide exudates (FIGS. 6 and 7) in comparison with the matrix of the inventive material (FIG. 5).

Figure 4:
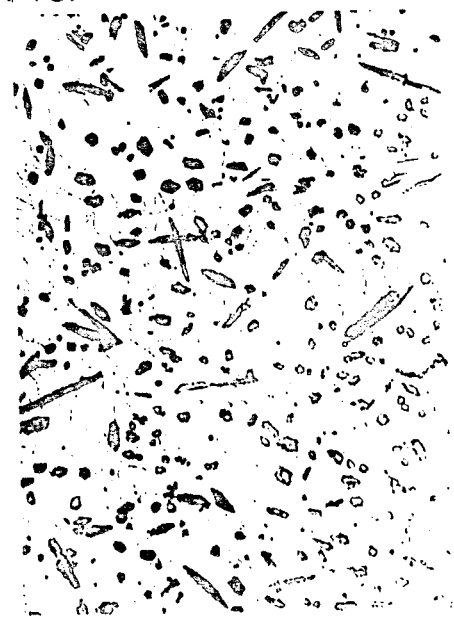

In FIG. 5 there can already be recognized that the silicide needles separate out smaller in size than in the matrix pursuant to FIG. 4. This is obtained through the twice as high chromium component (FIG. 4: 0.05%; FIG. 5: 0.10%) at an only slightly increased silicon content (FIG. 4: 2.25%; FIG. 5: 2.5%).

In FIG. 6 there is illustrated a matrix which is formed at an again redoubled chromium content of 0.20%, whereby the other constituents are almost identical with the alloy composition employed for FIG. 5. The manganese silicide exudates are here already extremely fine, and in that type of formed material, lead to a significantly deteriorated wear phenomenon. Additionally, there is already evidenced in this matrix a non-uniformity in the dispersion of the silicides (FIG. 6, lower right).

These non-uniformities become still more evident in the matrix pursuant to FIG. 7 whereby in this instance, in comparison with FIG. 6, the chromium content at an otherwise almost identical composition was again redoubled (0.40%). In the matrix pursuant to FIG. 6, besides the excessively fine manganese silicide exudates, these can be ascertained clear coarse silicide agglomerations, which lead to the nonusability of a material of that type for the intended applications.

From the material designated with the Alloy number 2, as well as the material CuZn40AL 2 which serves as the standard reference, synchronous rings were produced in accordance with the following preferred process. The continuously cast material was extruded at 650° C. into tubes with an approximately 85×70 mm diameter. Thereafter the tubes were cooled and cut into lengths. The tube sections were inductively heated to 650° C. and by means of stamping dies brought into synchronous ring shapes. Thereafter, the synchronous rings were stored at 250° C. for 10 hours for hardening. From these semi-finish articles there were withdrawn samples for wear testing, and a wear measurement was carried out pursuant to the Reichert system, which is elucidated hereinbelow. The results are represented in Table II:

TABLE II

| | Resistance to Wear | |
|---|---|---|
| | Alloy No. 2 | CuZn40Al 2 |
| Resistance to Wear in km/g | 1600–3100 | 150–200 |
| Hardness HB 2,5/62,5 | 180 | 170 |
| Component of α-Phase in Vol. % | 25 | 25 |

Besides the resistance to wear, which is indicated in kilometers per gram of material loss, there can also be ascertained from Table II the hardness of the specimen, as well as their matrix proportion in the α-phase.

As can be recognized, the hardness values of two sample specimen are almost identical, the proportion of the α-phase is even exactly alike.

These two values were determined essentially from the basic matrix, which is apparently quite similar with respect to its technological properties.

The resistance to wear of the specimen, which can be traced back to essentially the silicide exudates is, in contrast, quite different. In general, the extent of wear in the specimen of Alloy number 2 is less by more than one magnitude as compared to in the specimen of the reference material.

For a determination of the values of resistance to wear, there was employed a friction wear scale pursuant to the Reichert system which was correlated with the specialized purpose. The specimen consisted of a circular pin with a 2.7 mm diameter, whose contact surface was turned planar, and thus withdrawn from the synchronous ring, such that its contact surface commenced out of the region of the friction winding. Employed as a complementary member was a polished needle-bearing ring of 100Cr6 with an outer diameter of 35 mm, a hardness of 58 to 65 HRC, and a contact surface roughness of about 2 μm. The lubricating medium consisted of 75% by volume of transmission lubricant SQ M2C - 9008 A and 25% by volume of Shell fossil oil No. 10 at an immersion depth of the needle bearing of 10 mm.

Utilized Experimental Parameters:

Loading on the Specimen 300N corresponds to 52 N/mm$^2$;

Rotational speed of the ring of 100 rpm corresponds to a sliding speed of about 1.8 m/sec;

Lubricant temperature of about 100° C.;

Running period 2500 min.

As the extent of wear, there was considered the weight loss of the specimen, whereby the burrs formed on the specimen were removed prior to the determination of the weight loss. The resistance to wear indicated in Table II is the ratio of the running distance in kilometers and the weight loss in grams.

What is claimed is:

1. A brass alloy consisting essentially of:
   about 10 to about 35% zinc;
   about 4 to about 12% manganese;
   about 2 to about 7% aluminum;
   about 1.1 to about 4% silicon, with the proviso that said silicon is essentially present in the form of crystalline manganese silicide;
   about 0.01 to about 0.15% of an element selected from the group consisting of chromium, zirconium and mixtures thereof whereby the particle size of said manganese silicide is effective to provide optimum wear resistance;
   up to about 2% lead;
   up to about 2% nickel;
   up to about 1% impurities, with the proviso that iron not exceed more than 0.7% of said 1%; and
   the remainder being copper, said percentages all being by weight, based on the total weight of the composition.

2. A brass alloy as claimed in claim 1, wherein silicon is present in an amount of between about 1.5 and about 3%.

3. A brass alloy as claimed in claim 1, wherein said element selected from the group consisting of chromium, zirconium and mixtures thereof is present in an amount of between about 0.05 and about 0.1%.

4. A brass alloy as claimed in claim 1, wherein manganese is present in an amount of at least about 6%.

5. A brass alloy as claimed in claim 1, wherein said manganese silicide is present in an amount in excess of 5% by weight.

* * * * *